US008487780B2

(12) United States Patent
Edwardson

(10) Patent No.: US 8,487,780 B2
(45) Date of Patent: Jul. 16, 2013

(54) DEFINING APPROACH MAPS FOR TRAFFIC SIGNAL PREEMPTION CONTROLLERS

(75) Inventor: David John Edwardson, Shoreview, MN (US)

(73) Assignee: Global Traffic Technologies, Inc., St. Paul, MN (US)

( * ) Notice: Subject to any disclaimer, the term of this patent is extended or adjusted under 35 U.S.C. 154(b) by 764 days.

(21) Appl. No.: 12/731,780

(22) Filed: Mar. 25, 2010

(65) Prior Publication Data

US 2011/0234423 A1 Sep. 29, 2011

(51) Int. Cl.

| | |
|---|---|
| ***G08G 1/07*** | (2006.01) |
| ***G08G 1/00*** | (2006.01) |
| ***G08G 1/095*** | (2006.01) |
| ***G08G 1/01*** | (2006.01) |
| ***G08G 1/123*** | (2006.01) |
| ***G06F 7/00*** | (2006.01) |
| ***G06G 7/78*** | (2006.01) |
| ***G06G 7/70*** | (2006.01) |

(52) U.S. Cl.

USPC ........... 340/906; 340/902; 340/907; 340/916; 340/933; 340/988; 701/32.5; 701/300; 701/302; 701/117; 455/32.1; 455/345

(58) Field of Classification Search

USPC ................. 340/907, 906, 909, 910, 911, 924, 340/988, 990, 991, 993, 904, 539, 914, 917; 455/67.5, 67.1, 133, 227, 228, 32.1; 701/201, 701/202, 207, 208, 213, 117, 118, 119, 220

See application file for complete search history.

(56) References Cited

U.S. PATENT DOCUMENTS

| | | | | |
|---|---|---|---|---|
| 5,187,476 | A | 2/1993 | Hamer | |
| 5,202,683 | A | 4/1993 | Hamer et al. | |
| 5,345,232 | A | 9/1994 | Robertson | |
| 5,539,398 | A | 7/1996 | Hall et al. | |
| 5,602,739 | A | 2/1997 | Haagenstad et al. | |
| 6,064,319 | A | 5/2000 | Matta | |
| 6,621,420 | B1 | 9/2003 | Poursartip | |
| 6,985,090 | B2 | 1/2006 | Ebner et al. | |
| 7,307,547 | B2 | 12/2007 | Schwartz | |
| 7,327,280 | B2 * | 2/2008 | Bachelder et al. | 340/906 |
| 7,333,028 | B2 | 2/2008 | Schwartz | |
| 7,417,560 | B2 | 8/2008 | Schwartz | |

(Continued)

FOREIGN PATENT DOCUMENTS

| | | |
|---|---|---|
| DE | 198 42 912 | 3/2000 |
| WO | 2005/094544 | 10/2005 |

*Primary Examiner* — Jennifer Mehmood
*Assistant Examiner* — Mirza Alam
(74) *Attorney, Agent, or Firm* — Crawford Maunu PLLC

(57) ABSTRACT

Methods and systems for creating an approach map for a traffic signal preemption controller. A road map is displayed, and in response to user input for instantiating a first segment of an approach map, a first instance of a graphical object overlaying one of the plurality of roads is displayed. The one road represents an approach road to an intersection having the preemption controller. First segment location data that describes a first geographical area bounded by the first segment are determined from size and placement of the first instance of the graphical object on the road map and from location data associated with the one road. The first segment location data are stored in association with the approach map for the preemption controller. The preemption controller, once configured with the first segment location data, initiates traffic signal preemption in response to a preemption request transmitted from within the first geographical area described by the first segment location data.

19 Claims, 8 Drawing Sheets

U.S. PATENT DOCUMENTS

| | | | | |
|---|---|---|---|---|
| 7,515,064 | B2 | 4/2009 | Schwartz | |
| 2004/0196162 | A1* | 10/2004 | Brooke | 340/906 |
| 2005/0035878 | A1* | 2/2005 | Vassilevsky | 340/902 |
| 2005/0264431 | A1* | 12/2005 | Bachelder | 340/906 |
| 2008/0266136 | A1* | 10/2008 | Diba | 340/906 |
| 2008/0316055 | A1* | 12/2008 | Bachelder et al. | 340/906 |

* cited by examiner

DEFINING APPROACH MAPS FOR TRAFFIC SIGNAL PREEMPTION CONTROLLERS

FIELD OF THE INVENTION

The present invention is generally directed to traffic control preemption systems.

BACKGROUND

Traffic signals have long been used to regulate the flow of traffic at intersections. Generally, traffic signals have relied on timers or vehicle sensors to determine when to change traffic signal lights, thereby signaling alternating directions of traffic to stop, and others to proceed.

Emergency vehicles, such as police cars, fire trucks and ambulances, generally have the right to cross an intersection against a traffic signal. Emergency vehicles have in the past typically depended on horns, sirens and flashing lights to alert other drivers approaching the intersection that an emergency vehicle intends to cross the intersection. However, due to hearing impairment, air conditioning, audio systems and other distractions, often the driver of a vehicle approaching an intersection will not be aware of a warning being emitted by an approaching emergency vehicle.

Traffic control preemption systems assist authorized vehicles (police, fire and other public safety or transit vehicles) through signalized intersections by making a preemption request to the intersection controller. The controller will respond to the request from the vehicle by changing the intersection lights to green in the direction of the approaching vehicle. This system improves the response time of public safety personnel, while reducing dangerous situations at intersections when an emergency vehicle is trying to cross on a red light. In addition, speed and schedule efficiency can be improved for transit vehicles.

There are presently a number of known traffic control preemption systems that have equipment installed at certain traffic signals and on authorized vehicles. One such system in use today is the OPTICOM® system. This system utilizes a high power strobe tube (emitter), located in or on the vehicle, that generates light pulses at a predetermined rate, typically 10 Hz or 14 Hz. A receiver, which includes a photo detector and associated electronics, is typically mounted on the mast arm located at the intersection and produces a series of voltage pulses, the number of which are proportional to the intensity of light pulses received from the emitter. The emitter generates sufficient radiant power to be detected from over 2500 feet away. The conventional strobe tube emitter generates broad spectrum light. However, an optical filter is used on the detector to restrict its sensitivity to light only in the near infrared (IR) spectrum. This minimizes interference from other sources of light.

Intensity levels are associated with each intersection approach to determine when a detected vehicle is within range of the intersection. Vehicles with valid security codes and a sufficient intensity level are reviewed with other detected vehicles to determine the highest priority vehicle. Vehicles of equivalent priority are selected in a first come, first served manner. A preemption request is issued to the controller for the approach direction with the highest priority vehicle travelling on it.

Another common system in use today is the OPTICOM® GPS priority control system. This system utilizes a GPS receiver in the vehicle to determine location, speed, and heading of the vehicle. The information is combined with security coding information that consists of an agency identifier, vehicle class, and vehicle ID and is broadcast via a proprietary 2.4 GHz radio.

An equivalent 2.4 GHz radio located at the intersection along with associated electronics receives the broadcasted vehicle information. Approaches to the intersection are mapped using either collected GPS readings from a vehicle traversing the approaches or using location information taken from a map database. The vehicle location and direction are used to determine on which of the mapped approaches the vehicle is approaching toward the intersection and the relative proximity to it. The speed and location of the vehicle are used to determine the estimated time of arrival (ETA) at the intersection and the travel distance from the intersection. ETA and travel distances are associated with each intersection approach to determine when a detected vehicle is within range of the intersection and, therefore, a preemption candidate. Preemption candidates with valid security codes are reviewed with other detected vehicles to determine the highest priority vehicle. Vehicles of equivalent priority are generally selected in a first come, first served manner. A preemption request is issued to the controller for the approach direction with the highest priority vehicle travelling on it.

With metropolitan-wide networks becoming more prevalent, additional means for detecting vehicles via wired networks such as Ethernet or fiber optics and wireless networks such as Mesh or IEEE 802.11b/g may be available. With network connectivity to the intersection, vehicle tracking information may be delivered over a network medium. In this instance, the vehicle location is either broadcast by the vehicle itself over the network or it may broadcast by an intermediary gateway on the network that bridges between, for example, a wireless medium used by the vehicle and a wired network on which the intersection electronics resides. In this case, the vehicle or an intermediary reports, via the network, the vehicle's security information, location, speed, and heading, along with the current time. Intersections on the network receive the vehicle information and evaluate the position using approach maps as described in the OPTICOM® GPS system. The security coding could be identical to the OPTICOM® GPS system or employ another coding scheme.

As used herein, the term "vehicle control unit" refers to the various types of modules capable of communicating a preemption request to a preemption controller. This includes, for example, IR light based modules, GPS based modules, and wireless network based modules. In addition, a preemption request refers to both preemption requests that emanate from emergency vehicles and to what are sometimes referred to as "priority requests," which emanate from mass transit vehicles, for example.

SUMMARY

The embodiments of the invention provide methods and systems for creating an approach map for a traffic signal preemption controller. In one embodiment, a method includes displaying a road map with a computer system. The road map represents a plurality of roads and intersections. In response to user input for instantiating a first segment of an approach map, a first instance of a graphical object overlaying one of the plurality of roads is displayed. The one road represents an approach road to an intersection having the preemption controller. First segment location data descriptive of a first geographical area bounded by the first segment are determined from size and placement of the first instance of the graphical object on the road map and from location data associated with the one road. The first segment location data are stored in association with the approach map for the preemption controller in a processor-readable storage device. The preemption controller, once configured with the first segment location data, initiates traffic signal preemption in response to a preemption request transmitted from within the first geographical area described by the first segment location data.

In another embodiment, a system is provided for managing geographically dispersed traffic signal preemption control equipment. The traffic signal preemption control equipment includes traffic signal preemption controllers and vehicle control units. The system includes at least one processor and a memory arrangement coupled to the processor. The memory arrangement is configured with instructions for execution by the processor. Execution of the instructions by the at least one processor causes the at least one processor to display a road map. The road map represents a plurality of roads and intersections. In response to user input for instantiating a first segment of an approach map, a first instance of a graphical object overlaying one of the plurality of roads is displayed. The one road represents an approach road to an intersection having the preemption controller. First segment location data descriptive of a first geographical area bounded by the first segment are determined from size and placement of the first instance of the graphical object on the road map and from location data associated with the one road. The first segment location data are stored in association with the approach map for the preemption controller. The preemption controller, once configured with the first segment location data, initiates traffic signal preemption in response to a preemption request transmitted from within the first geographical area described by the first segment location data.

Another embodiment is an article of manufacture that includes a processor-readable storage device configured with instructions for managing geographically dispersed traffic signal preemption control equipment. The traffic signal preemption control equipment includes traffic signal preemption controllers and vehicle control units. Executing the instructions by one or more processors causes the one or more processors to perform operations including displaying a road map. The road map represents a plurality of roads and intersections. The operations further include displaying in response to user input for instantiating a first segment of an approach map, a first instance of a graphical object overlaying one of the plurality of roads. The one road represents an approach road to an intersection having the preemption controller. First segment location data descriptive of a first geographical area bounded by the first segment are determined from size and placement of the first instance of the graphical object on the road map and from location data associated with the one road. The operations also include storing the first segment location data in association with the approach map for the preemption controller. The preemption controller, once configured with the first segment location data, initiates traffic signal preemption in response to a preemption request transmitted from within the first geographical area described by the first segment location data.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Various aspects and advantages of the invention will become apparent upon review of the following detailed description and upon reference to the drawings in which.

DETAILED DESCRIPTION

Some traffic signal preemption systems, such as GPS-based systems, use approach maps in determining when to preempt a traffic signal. Generally, an approach map defines the boundaries of an area relative to a preemption controller. If an authorized vehicle is within the defined boundaries and communicates a preemption request to the preemption controller, the preemption is granted, assuming there is no competing, higher-priority request.

Prior systems for creating approach maps required personnel to travel on the road for which the approach is desired and record GPS waypoints while moving. The gathered waypoints were then used to define the boundaries of an approach map. Once the boundaries were defined, a traffic engineer would connect a programming device to the preemption controller and program the controller with the approach map. Such a process may be time consuming and expensive since travel was required on every road of every intersection where an approach map was desired.

The various embodiments of the invention provide methods and systems for creating approach maps for a traffic signal preemption controller without requiring travel to the intersections. In one embodiment, a road map is displayed with a computer system. The road map represents a plurality of roads and intersections. In response to user input for instantiating a first segment of an approach map, a first instance of a graphical object is displayed overlaid on one of the roads in the road map. The road represents an approach to an intersection having a preemption controller of interest. From size and placement of the first instance of the graphical object on the road map and from location data associated with the road, the method determines location data that describes a first geographical area represented by the first segment. The first segment location data are stored in a processor-readable storage device in association with the approach map for the preemption controller. The preemption controller, once configured with the first segment location data, initiates traffic signal preemption in response to a preemption request transmitted from within the first geographical area described by the first segment location data.

Figure 1:
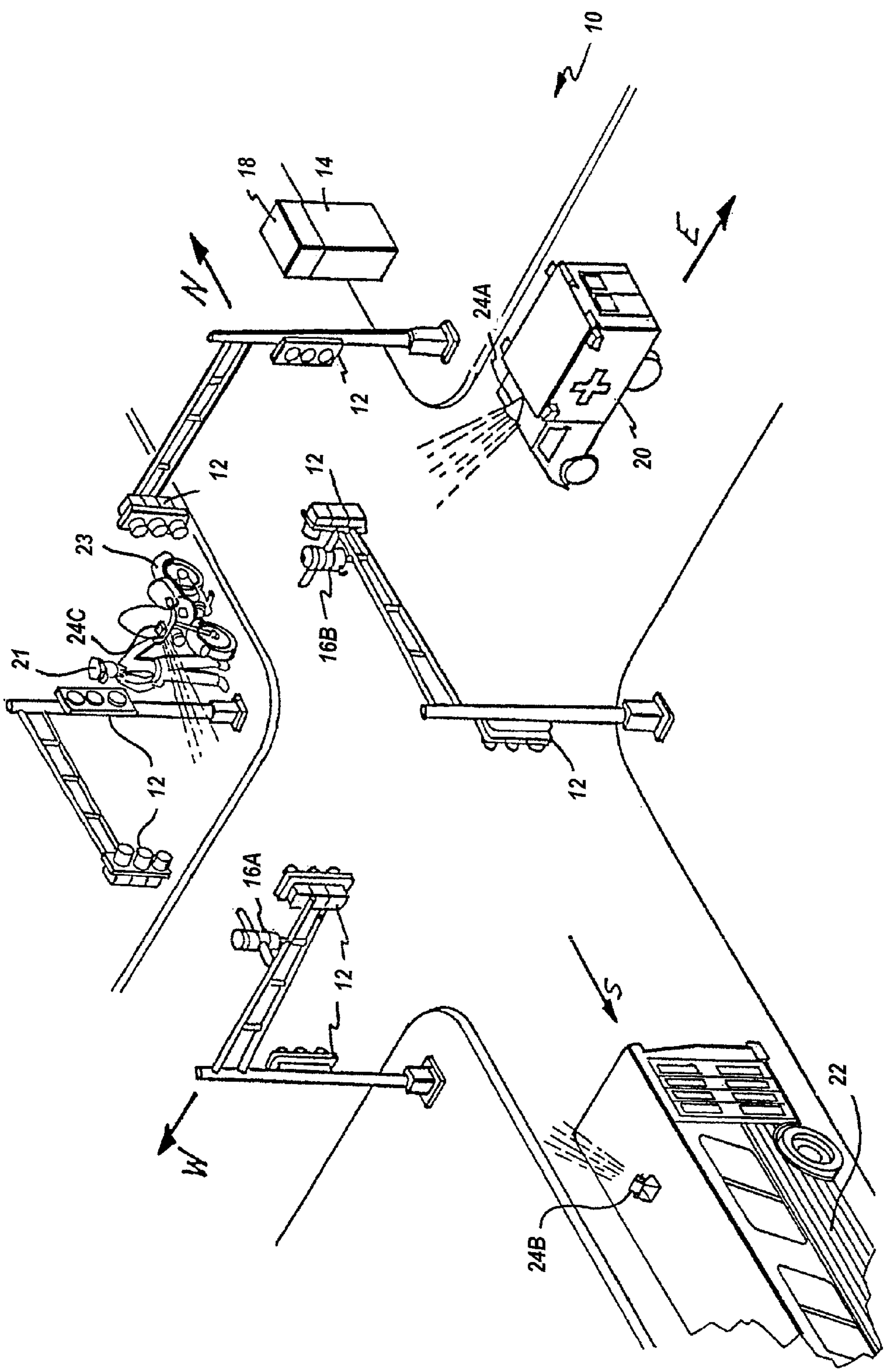
FIG. 1 is an illustration of a typical intersection having traffic signal lights.

FIG. 1 is an illustration of a typical intersection 10 having traffic signal lights 12. The equipment at the intersection illustrates the environment in which embodiments of the present invention may be used. A traffic signal controller 14 sequences the traffic signal lights 12 to allow traffic to proceed alternately through the intersection 10. The intersection 10 may be equipped with a traffic control preemption system such as the OPTICOM® Priority Control System, the OPTICOM GPS priority control system, or a networked system.

The traffic control preemption system shown in FIG. 1 includes detector assemblies 16A and 16B, signal emitters 24A, 24B and 24C (also referred to herein as "vehicle control units"), a traffic signal controller 14, and a phase selector 18 (also referred to herein as a "preemption controller"). The detector assemblies 16A and 16B are stationed to detect signals emitted by authorized vehicles approaching the intersection 10. The detector assemblies 16A and 16B communicate with the phase selector, which is typically located in the same cabinet as the traffic signal controller 14.

In FIG. 1, an ambulance 20 and a bus 22 are approaching the intersection 10. The signal emitter 24A is mounted on the ambulance 20 and the signal emitter 24B is mounted on the bus 22. The signal emitters 24A and 24B each transmit a signal that is received by detector assemblies 16A and 16B. The detector assemblies 16A and 16B send output signals to the phase selector. The phase selector processes the output signals from the detector assemblies 16A and 16B to determine the signal characteristics including: frequency, intensity, and security code of the signal waveform, or pulses. The security code, consisting of the vehicle class and vehicle identification is encoded in the signal by interleaving data pulses between the base frequency pulses. In GPS systems, location, speed, and heading of the vehicle are also determined and transmitted to the phase selector. The phase selector in a GPS system uses the location data to determine whether or not the vehicle is within the boundaries or an approach map. If so, the preemption request may be granted. In optical systems, if an acceptable frequency, intensity, and or security code is observed the phase selector generates a preemption request to the traffic signal controller 14 to preempt a normal traffic signal sequence. The phase selector alternately issues preemption requests to and withdraws preemption requests from the traffic signal controller, and the traffic signal controller determines whether the preemption requests can be granted. The traffic signal controller may also receive preemption requests originating from other sources, such as a nearby railroad crossing, in which case the traffic signal controller may determine that the preemption request from the other source be granted before the preemption request from the phase selector. In some embodiments of the present invention the function of the phase selector is performed solely by the traffic signal controller.

The traffic signal controller determines the priority of each signal received and whether to preempt traffic control based on the security code contained in the signal. For example, the ambulance 20 may be given priority over the bus 22 since a human life may be at stake. Accordingly, the ambulance 20 would transmit a preemption request with a security code indicative of a high priority while the bus 20 would transmit a preemption request with a security code indicative of a low priority. The phase selector would discriminate between the low and high priority signals and request the traffic signal controller 14 to cause the traffic signal lights 12 controlling the ambulance's approach to the intersection to remain or become green and the traffic signal lights 12 controlling the bus's approach to the intersection to remain or become red.

Figure 2:
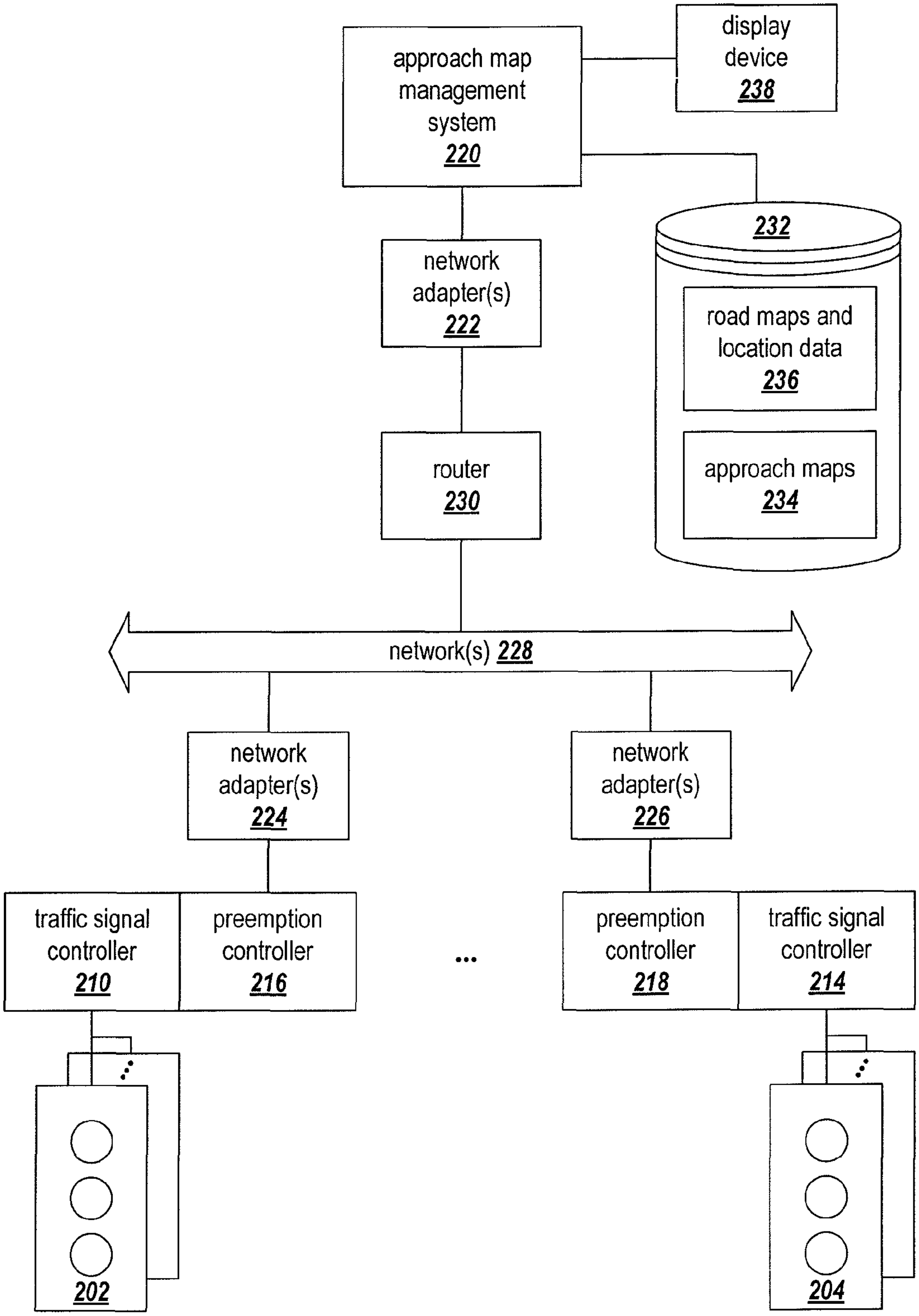
FIG. 2 is a block diagram of an example system for defining approach maps for traffic signal preemption controllers in accordance with an embodiment of the invention.

FIG. 2 is a block diagram of an example system for defining approach maps for traffic signal preemption controllers in accordance with an embodiment of the invention. Traffic lights 202 and 204 at intersections with preemption controllers are coupled to traffic signal controllers 210 and 214, respectively. Traffic signal controllers 210 and 214 are connected to respective preemption controllers 216 and 218. Each preemption controller is configured with memory for storing approach maps (not shown). A management system 220 and the preemption controllers are respectively coupled to network adapters 220, 224, and 226 for communication over a network 228. In various embodiments, a router or a network switch, as shown by router 230, may be coupled between the network adapter and the network. It is understood the management system 220 and the preemption controllers 216 and 218 may be connected through more than one network, coupled by additional switches and routing resources, including a connection over the Internet.

The management system 220 is additionally coupled to a storage arrangement 232, which stores approach maps 234, along with road maps and associated location data 236. Each approach map is associated with one of the preemption controllers 216 or 218 and includes data that define the boundaries of a geographic area near a road that approaches the preemption controller. The boundary-defining data of an approach map is derived from the placement of the approach map relative to a road on the display device 238, in combination with the location data describing the road. It will be recognized that storage arrangement 232 may comprise several local and/or remote servers and one or more databases.

The management system 220 provides a system for creating the approach maps and configuring the preemption controllers with the approach maps. The interface allows a user to create, edit, and delete approach maps. In response to user selection of a geographic area, the management system displays the road map on a computer monitor, for example. In one embodiment, data from a geographic information system (GIS) is used in preparing and displaying the road map. The GIS includes GPS data associated with locations on the road map. The management system provides an interface for instantiating approach maps on the road map as displayed on the display device. The relative placement of an approach map on the displayed road map and the GPS data associated with the road map are used to determine the boundaries of the approach map. The approach map is downloaded to the proper preemption controller. Stored approach maps 234 may similarly be edited or deleted with the management system, and updated configurations downloaded to the proper preemption controllers 216 and 218.

It is understood that numerous network transfer protocols may be used to establish, maintain, and route connections including: TCP/IP, UDP, NFS, ESP, SPX, etc. It is also understood that network transfer protocols may utilize one or more lower layers of protocol communication such as ATM, X.25, or MTP, and on various physical and wireless networks such as, Ethernet, ISDN, ADSL, SONET, IEEE 802.11, V.90/v92 analog transmission, etc.

Figure 3:
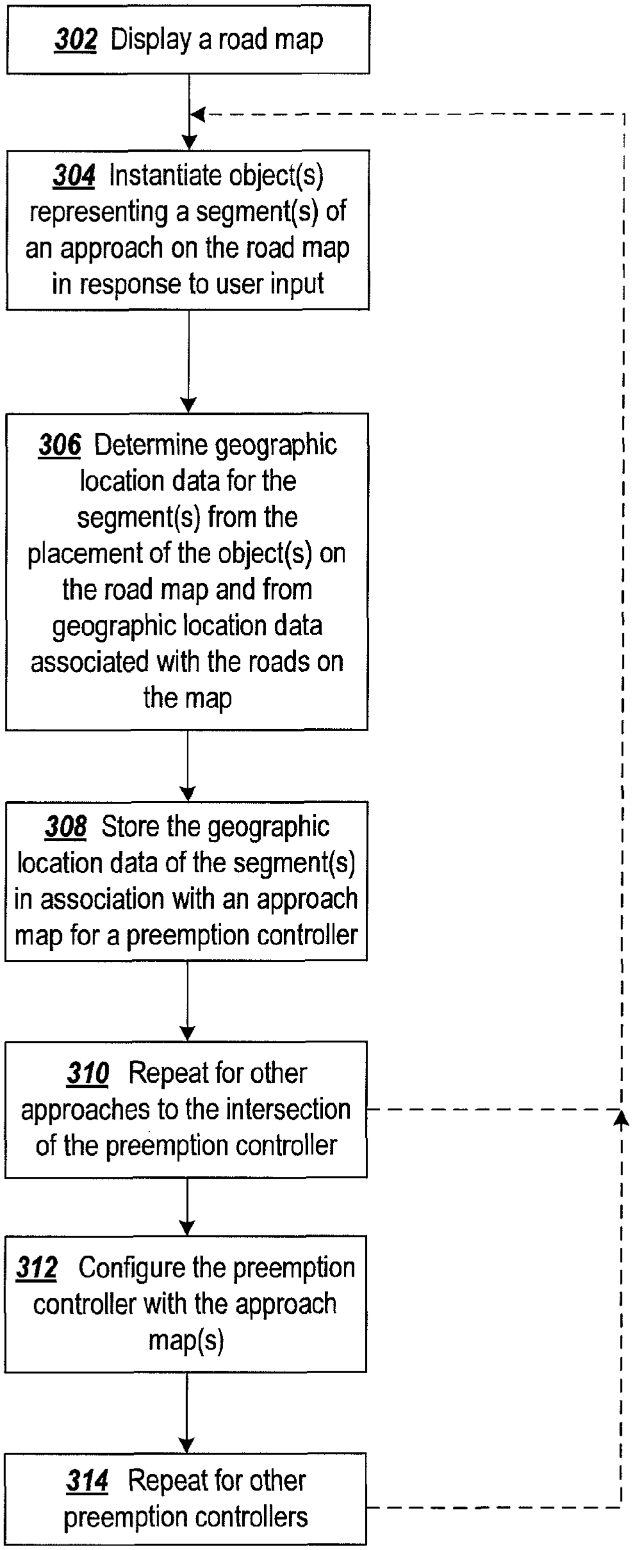
FIG. 3 is a flowchart of an example process for creating approach maps in accordance with one or more embodiments of the invention.

FIG. 3 is a flowchart of an example process for creating approach maps in accordance with one or more embodiments of the invention. A road map is displayed on a computer display device at step 302. The display of the map may be initiated by a user operating a user interface and designating a locale for which the roads are to be displayed. As indicated above, the map information may be provided by a GIS.

At step 304, in response to user input, one or more objects are instantiated and displayed on the road map. Each object represents a segment of an approach map. In one embodiment, each object may be moved by selecting the object and dragging the object with a mouse. Similarly, the size of the segment may be adjusted by dragging handles on the object.

An approach map may include one or more segments. Multiple segments may be grouped or linked into one approach map.

The geographic boundaries of the segment represented by the object are determined at step 306 using the placement of the object relative to the displayed road in combination with the geographic location data, e.g., GPS data, associated with the road. At step 308, the geographic location data of the segment are stored in association with an approach map for a particular preemption controller. The process may then be repeated for other approaches to the intersection as shown by the step 310 that returns the process to step 304.

At step 312, the preemption controller is configured with one or more approach maps. Generally, each approach to an intersection has an approach map. The preemption controller, once configured with location data of an approach map, initiates traffic signal preemption in response to a preemption request transmitted from within the boundaries of the approach map. At step 314, the process may be returned to step 304 to create approach maps for other preemption controllers.

Figure 4:
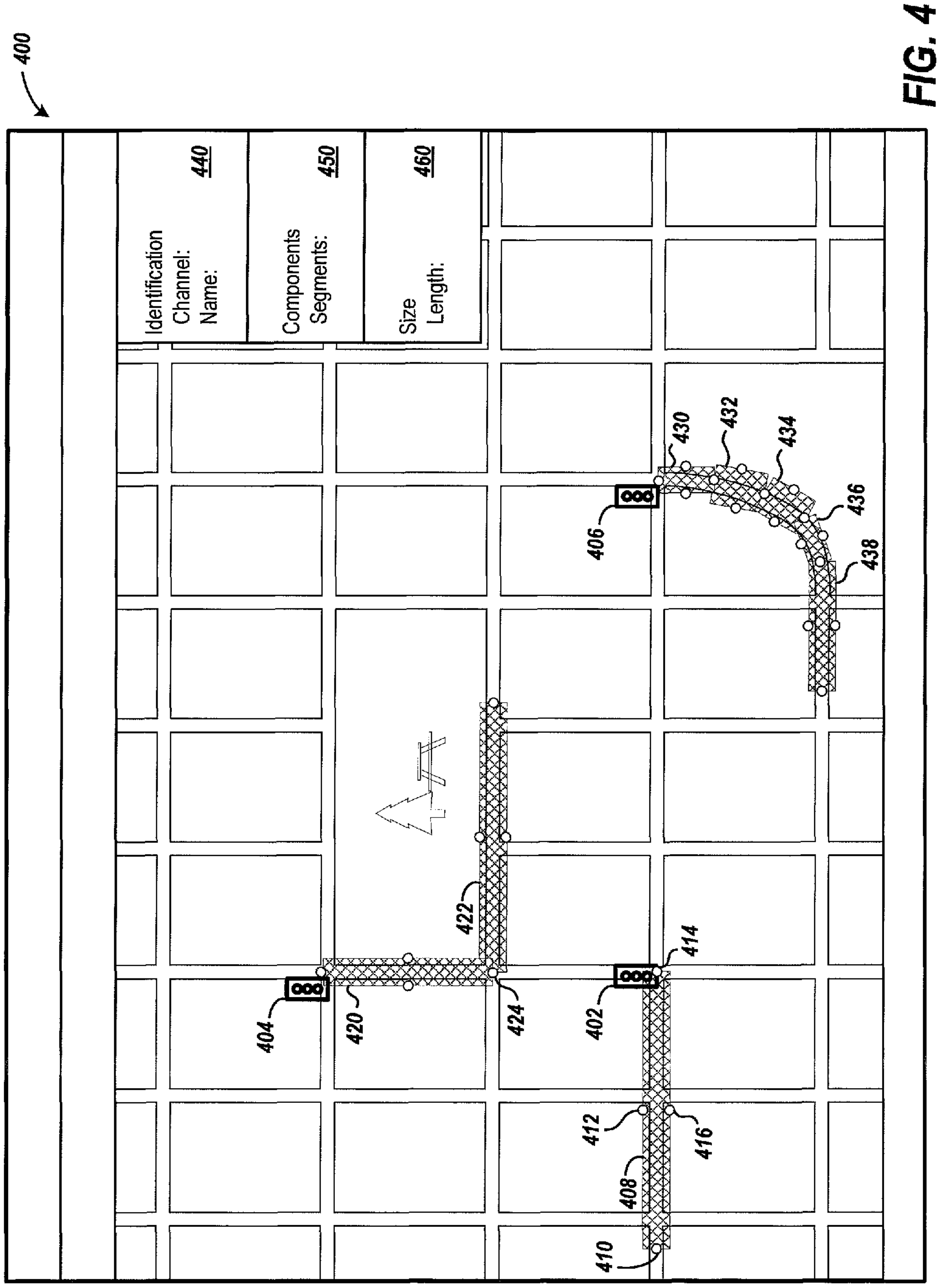
FIG. 4 shows an example display screen in which a road map is displayed in combination with different approach maps for preemption controllers at different intersections.

FIG. 4 shows an example display screen in which a road map is displayed in combination with different approach maps for preemption controllers at different intersections. FIG. 4 shows three different approach maps for three different preemption controllers 402, 404, and 406 at three different intersections. Depending on implementation and user requirements, the display may be limited to displaying the approach maps for one intersection at a time. Alternatively, the approach maps of multiple intersections may be displayed at one time.

In one embodiment, an approach map is created in response to a user right-clicking on the map where the approach should be, and selecting New/Approach from a pop-up menu (not shown). More segments may be added to the approach by right-clicking a location on the map and selecting New\Segment. A new segment can also be added to the approach via the property grid control 450 on the right-hand side of the map.

Each segment includes handles that can be manipulated for resizing the segment. For example, segment 408 has handles 410, 412, 414, and 416. Clicking and dragging a handle with a mouse expands or contracts the segment depending on the direction in which the handle is moved. The entire segment can be moved by selecting the segment and dragging it with a mouse, for example.

This will also cause any attached segments to be adjusted. The endpoint of a segment can be selected to adjust the length of the segment and a selection handle will exist on the sides of the selected segment to allow the segment width to be adjusted. Segment 408 shows an example of an approach map that includes only one segment.

Approach maps may include any number of segments on any number of roads. For example, the approach map for the preemption controller associated with traffic signal 404 includes segments 420 and 422. The handles on the segments can be manipulated to attach one segment to another. Once attached, the segments can be moved as a single unit. For example, handle 424 shows alignment of handles from both of segments 420 and 422. When so aligned, the system recognizes the segments as being attached, and clicking on either of the segments with a mouse and moving the mouse causes movement of both segments. When two segments are attached each can be individually resized.

A third example approach map is shown for the intersection having traffic signal 406. The approach map includes segments 430, 432, 434, 436, and 438, all on one road. The segments are attached via their coincident handles as shown.

In one embodiment, moving a cursor over a segment causes the system to display data about the approach (name and preemption controller channel) and the segment (width and length).

In another embodiment, a properties section on the right side of the map displays properties of the selected approach. The user may change the properties of the approach by modifying the values (not shown) of the items in the properties section. The properties section includes an identification subsection 440, a components subsection 450, and a size subsection 460. The Identification subsection includes the channel and name of the approach map. The Components subsection includes a count of the segments that define the approach. The segments in the approach can be edited by clicking on the count of the segments and using a popup editor to modify (e.g., length and/or width) the individual segments (see FIG. 5). The Size subsection includes the overall length of the approach in meters and/or feet. The length is the sum of the lengths of the segments.

Figure 5:
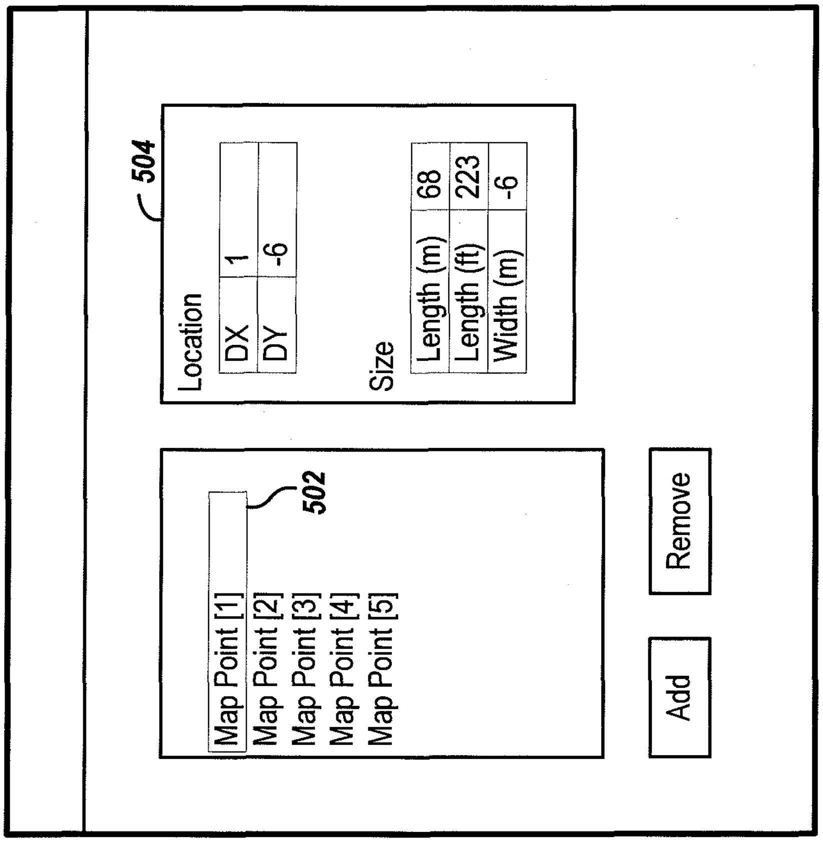
FIG. 5 shows an example display screen for displaying and/or editing various attributes of individual segments of an approach map.

FIG. 5 shows an example display screen for displaying and/or editing various attributes of individual segments of an approach map. The Map Points are the endpoints of the individual segments of the approach. Each segment has two endpoints with the tail endpoint of one segment being shared with the front endpoint of the next segment. There are five map points for the four segments of the example approach.

In FIG. 5, Map Point [1] is selected for editing as exemplified by box 502. The data in box 504 describes the location of the selected endpoint. These values can be edited by clicking on the value and entering the desired value. The DX and DY values represent the difference in X and Y coordinates from the intersection preemption controller to the Map Point of the segment. In one embodiment, only the width can be edited by entering the displayed value, and editing of the length of a segment is limited to dragging the handles of the corresponding object in the interface shown in FIG. 4. In an alternative embodiment, any of the values may be edited in the table of FIG. 5.

The Size values include the length and width of the segment indicated by the selected Map Point. The length and width are also user editable.

Figure 6:
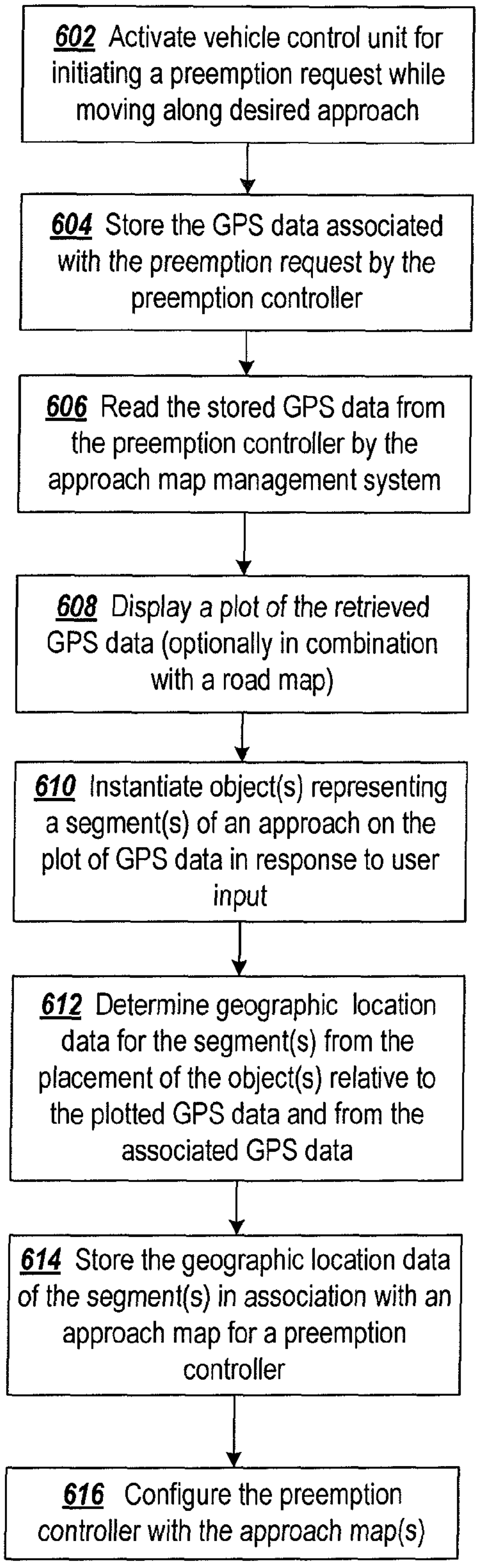
FIG. 6 is a flowchart of an example process for creating an approach map in accordance with another embodiment of the invention.

FIG. 6 is a flowchart of an example process for creating an approach map in accordance with another embodiment of the invention. The embodiment of FIG. 6 provides a method for creating an approach map for a preemption controller in a situation where the GIS does not yet have mapping data for one or more roads. For example, when new roads are constructed in an area under development it may be some time before the GIS has the necessary data to display these roads.

According to the method of FIG. 6, at step 602 a vehicle control unit is activated for initiating a preemption request while moving along the desired approach. The preemption controller of interest stores the GPS data associated with the preemption request in its local memory at step 604. The approach management system reads the stored GPS data from the preemption controller at step 606, and at step 608 a plot of the retrieved GPS data is displayed for the user. In one embodiment, if there is any existing GIS data available for the general vicinity of the GPS data, those roads may be displayed in combination with the GPS plot.

At step 610, in response to user input, one or more objects are instantiated and displayed along with the GPS plot. Each object represents a segment of an approach map, and the segments may be resized, placed, and oriented as described above. Once placed, at step 612 the geographic boundaries of the segments represented by the objects are determined using the placement of the objects relative to the displayed GPS plot along with the associated GPS data. At step 614, the geographic location data of the segment are stored in association with an approach map for the desired preemption controller. The process may then be repeated for other approaches to the intersection. At step 616, the preemption controller is configured with one or more approach maps.

Figure 7:
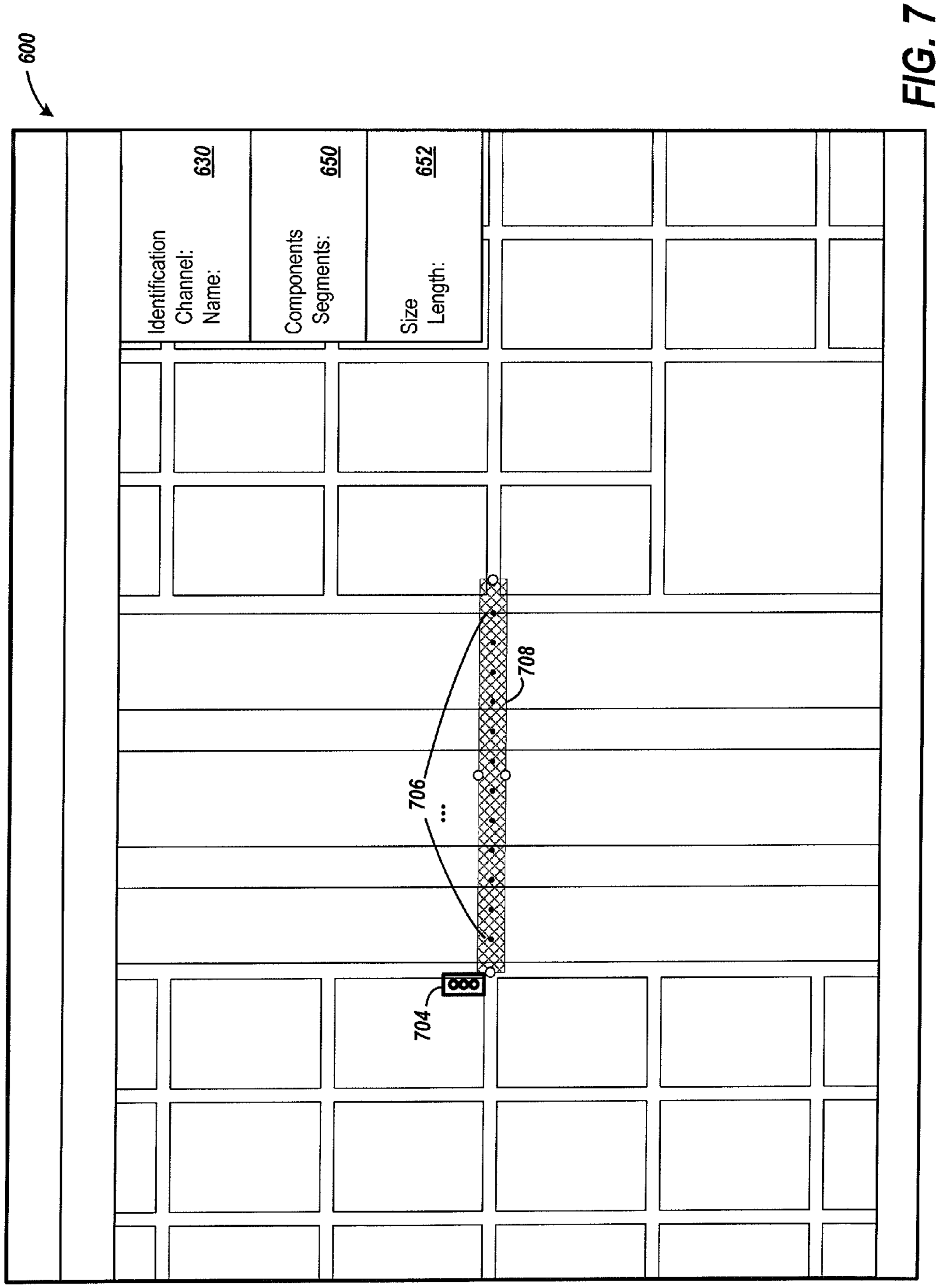
FIG. 7 shows an example display screen in which the road map is out-of-date and does not show a new road.

FIG. 7 shows an example display screen in which the road map is out-of-date and does not show a new road. The location data for the new road, such as a new overpass, for example, is gathered by transmitting location data of a vehicle as it traverses the new road to a preemption controller associated with traffic signal 704. The management system 220 reads the recorded GPS data from the preemption controller, and that data can then be used to create approach maps.

In response to user input that requests displaying the GPS data gathered by a preemption controller, the management system displays a plot of the GPS data. In the example, dots 706 represent GPS data gathered by the preemption controller associated with traffic signal 704. Each dot represents a GPS point transmitted to the preemption controller from the vehicle. Once the plot of location data is displayed, the user can create a segment as described above. Instead of placing a segment relative to a road on the map, the segment 708 may be sized, oriented, and placed relative to the GPS plot. Each segment thus placed can be edited as described above.

Figure 8:
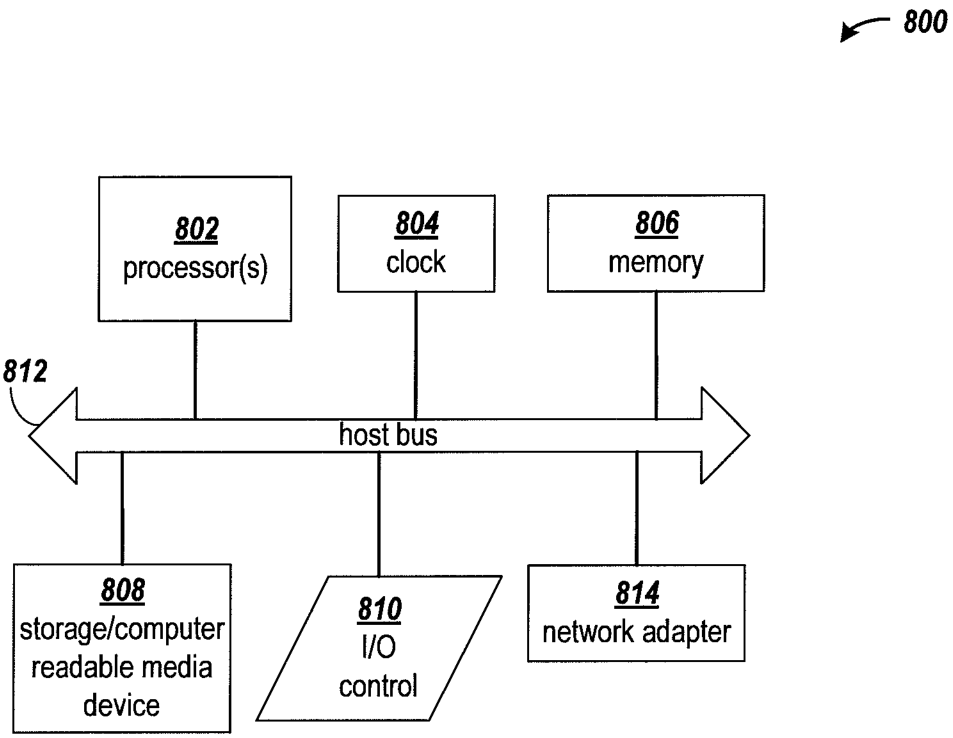
FIG. 8 is a block diagram of an example computing arrangement which can be configured to implement the processes performed by the preemption controller and central systems server described herein.

FIG. 8 is a block diagram of an example computing arrangement which can be configured to implement the processes performed by the preemption controller and central systems server described herein. Those skilled in the art will appreciate that various alternative computing arrangements, including one or more processors and a memory arrangement configured with program code, would be suitable for hosting the processes and data structures and implementing the algorithms of the different embodiments of the present invention. The computer code, comprising the processes of the present invention encoded in a processor executable format, may be stored and provided via a variety of computer-readable storage media or delivery channels such as magnetic or optical disks or tapes, electronic storage devices, or as application services over a network.

Processor computing arrangement 800 includes one or more processors 802, a clock signal generator 804, a memory unit 806, a storage unit 808, a network adapter 814, and an input/output control unit 810 coupled to host bus 812. The arrangement 800 may be implemented with separate components on a circuit board or may be implemented internally within an integrated circuit.

The architecture of the computing arrangement depends on implementation requirements as would be recognized by those skilled in the art. The processor 802 may be one or more general purpose processors, or a combination of one or more general purpose processors and suitable co-processors, or one or more specialized processors (e.g., RISC, CISC, pipelined, etc.).

The memory arrangement 806 typically includes multiple levels of cache memory and a main memory. The storage arrangement 808 may include local and/or remote persistent storage such as provided by magnetic disks (not shown), flash, EPROM, or other non-volatile data storage. The storage unit may be read or read/write capable. Further, the memory 806 and storage 808 may be combined in a single arrangement.

The processor arrangement 802 executes the software in storage 808 and/or memory 806 arrangements, reads data from and stores data to the storage 808 and/or memory 806 arrangements, and communicates with external devices through the input/output control arrangement 810 and network adapter 814. These functions are synchronized by the clock signal generator 804. The resources of the computing arrangement may be managed by either an operating system (not shown), or a hardware control unit (not shown).

The present invention is thought to be applicable to a variety of systems for a preemption controller. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for creating an approach map for a traffic signal preemption controller, comprising:

displaying a road map with a computer system, wherein the road map represents a plurality of roads and intersections;

displaying in response to user input for instantiating a first segment of an approach map, a first instance of a graphical object overlaying one of the plurality of roads, the one road representing an approach road to an intersection having the preemption controller;

determining first segment location data descriptive of a first geographical area bounded by the first segment from size and placement of the first instance of the graphical object on the road map and from location data associated with the one road; and storing in a non-transitory processor-readable storage device, the first segment location data in association with the approach map for the preemption controller, wherein the preemption controller, once configured with the first segment location data, initiates traffic signal preemption in response to a preemption request transmitted from within the first geographical area described by the first segment location data.

2. The method of claim 1, further comprising:

displaying in response to user input for instantiating a second segment of the approach map, a second instance of the graphical object overlaying the one road;

determining second segment location data descriptive of a second geographical area bounded by the second segment from size and placement of the second instance of the graphical object on the road map and from location data associated with the one road; and storing in the non-transitory processor-readable storage device, the second segment location data in association with the approach map for the preemption controller, wherein the preemption controller, once configured with the second segment location data, initiates traffic signal preemption in response to a preemption request transmitted from within the second geographical area described by the second segment location data.

3. The method of claim 1, further comprising:

displaying in response to user input for instantiating a second segment of the approach map, a second instance of the graphical object overlaying a second one of the plurality of roads;

determining second segment location data descriptive of a second geographical area bounded by the second segment from size and placement of the second instance of the graphical object on the road map and from location data associated with the second one of the roads; and storing in the non-transitory processor-readable storage device, the second segment location data in association with the approach map for the preemption controller, wherein the preemption controller, once configured with the second segment location data, initiates traffic signal preemption in response to a preemption request transmitted from within the second geographical area described by the second segment location data.

4. The method of claim 2, further comprising:

providing user-controllable linking handles on each of the first and second instances of the graphical objects;

attaching the first instance to the second instance of the graphical object via the linking handles in response to coincident placement of the linking handles by the user; and in response to movement of the first instance of the graphical object by a user after the attaching, moving the second instance of the graphical object by an amount and in a direction equal to movement of the first instance of the graphical object.

5. The method of claim 3, further comprising:

providing user-controllable linking handles on each of the first and second instances of the graphical objects; and attaching the first instance to the second instance of the graphical object via the linking handles in response to coincident placement of the linking handles by the user.

6. The method of claim 1, further comprising:

providing user-controllable sizing handles on the first instance of the graphical object; and adjusting the size of the first instance of the graphical object in response to user movement of one of the sizing handles.

7. The method of claim 1, further comprising displaying user-editable textual data describing the first segment, wherein the user-editable textual data specifies changes in X and Y coordinates from an intersection to a geographic location represented by an endpoint of the first instance of the graphical object.

8. The method of claim 1, further comprising displaying user-editable textual data describing the first segment, wherein the user-editable textual data specifies changes in width of the first geographical area.

9. The method of claim 1, further comprising:

storing a plurality of geography points in a non-transitory processor-readable storage device, each geography point describing a geographic location on one or more new roads having no representation in the road map;

displaying on the road map, a plurality of point-type objects corresponding to the plurality of geography points, respectively;

displaying in response to user input for instantiating a second segment of an approach map, a second instance of a graphical object overlaying a subset of the point-type objects corresponding to one of the one or more new roads, the one new road representing an approach road to an intersection having a preemption controller;

determining second segment location data descriptive of a second geographical area bounded by the second segment from size and placement of the second instance of the graphical object on the road map and from the respective geography points corresponding to the subset of the point-type objects; and storing in a non-transitory processor-readable storage device, the second segment location data in association with an approach map for a preemption controller, wherein the preemption controller, once configured with the second segment location data, initiates traffic signal preemption in response to a preemption request transmitted from within the second geographical area described by the second segment location data.

10. A system for managing geographically dispersed traffic signal preemption control equipment, the traffic signal preemption control equipment including traffic signal preemption controllers and vehicle control units, comprising:

at least one processor;

a memory arrangement coupled to the processor, wherein the memory arrangement is configured with instructions for execution by the processor, wherein execution of the instructions by the at least one processor causes the at least one processor to perform operations including: displaying a road map, wherein the road map represents a plurality of roads and intersections;

displaying in response to user input for instantiating a first segment of an approach map, a first instance of a graphical object overlaying one of the plurality of roads, the one road representing an approach road to an intersection having the preemption controller;

determining first segment location data descriptive of a first geographical area bounded by the first segment from size and placement of the first instance of the graphical object on the road map and from location data associated with the one road; and storing the first segment location data in association with the approach map for the preemption controller, wherein the preemption controller, once configured with the first segment location data, initiates traffic signal preemption in response to a preemption request transmitted from within the first geographical area described by the first segment location data.

11. The system of claim 10, further comprising:

displaying in response to user input for instantiating a second segment of the approach map, a second instance of the graphical object overlaying the one road;

determining second segment location data descriptive of a second geographical area bounded by the second segment from size and placement of the second instance of the graphical object on the road map and from location data associated with the one road; and storing in the non-transitory processor-readable storage device, the second segment location data in association with the approach map for the preemption controller, wherein the preemption controller, once configured with the second segment location data, initiates traffic signal preemption in response to a preemption request transmitted from within the second geographical area described by the second segment location data.

12. The system of claim 10, further comprising:

displaying in response to user input for instantiating a second segment of the approach map, a second instance of the graphical object overlaying a second one of the plurality of roads;

determining second segment location data descriptive of a second geographical area bounded by the second segment from size and placement of the second instance of the graphical object on the road map and from location data associated with the second one of the roads; and storing in the non-transitory processor-readable storage device, the second segment location data in association with the approach map for the preemption controller, wherein the preemption controller, once configured with the second segment location data, initiates traffic signal preemption in response to a preemption request transmitted from within the second geographical area described by the second segment location data.

13. The system of claim 11, further comprising:

providing user-controllable linking handles on each of the first and second instances of the graphical objects;

attaching the first instance to the second instance of the graphical object via the linking handles in response to coincident placement of the linking handles by the user; and in response to movement of the first instance of the graphical object by a user after the attaching, moving the second instance of the graphical object by an amount and in a direction equal to movement of the first instance of the graphical object.

14. The system of claim 12, further comprising:

providing user-controllable linking handles on each of the first and second instances of the graphical objects; and attaching the first instance to the second instance of the graphical object via the linking handles in response to coincident placement of the linking handles by the user.

15. The system of claim 10, further comprising:

providing user-controllable sizing handles on the first instance of the graphical object; and adjusting the size of the first instance of the graphical object in response to user movement of one of the sizing handles.

16. The system of claim 10, further comprising displaying user-editable textual data describing the first segment, wherein the user-editable textual data specifies changes in X and Y coordinates from an intersection to a geographic location represented by an endpoint of the first instance of the graphical object.

17. The system of claim 10, further comprising displaying user-editable textual data describing the first segment, wherein the user-editable textual data specifies changes in width of the first geographical area.

18. The system of claim 10, further comprising:

storing a plurality of geography points in a non-transitory processor-readable storage device, each geography point describing a geographic location on one or more new roads having no representation in the road map;

displaying on the road map, a plurality of point-type objects corresponding to the plurality of geography points, respectively;

displaying in response to user input for instantiating a second segment of an approach map, a second instance of a graphical object overlaying a subset of the point-type objects corresponding to one of the one or more new roads, the one new road representing an approach road to an intersection having a preemption controller;

determining second segment location data descriptive of a second geographical area bounded by the second segment from size and placement of the second instance of the graphical object on the road map and from the respective geography points corresponding to the subset of the point-type objects; and storing in a non-transitory processor-readable storage device, the second segment location data in association with an approach map for a preemption controller, wherein the preemption controller, once configured with the second segment location data, initiates traffic signal preemption in response to a preemption request transmitted from within the second geographical area described by the second segment location data.

19. An article of manufacture, comprising:

a non-transitory processor-readable storage device configured with instructions for managing geographically dispersed traffic signal preemption control equipment, the traffic signal preemption control equipment including traffic signal preemption controllers and vehicle control units, wherein in executing the instructions by one or more processors causes the one or more processors to perform operations including:

displaying a road map, wherein the road map represents a plurality of roads and intersections;

displaying in response to user input for instantiating a first segment of an approach map, a first instance of a graphical object overlaying one of the plurality of roads, the one road representing an approach road to an intersection having the preemption controller;

determining first segment location data descriptive of a first geographical area bounded by the first segment from size and placement of the first instance of the graphical object on the road map and from location data associated with the one road; and storing in a non-transitory processor-readable storage device, the first segment location data in association with the approach map for the preemption controller, wherein the preemption controller, once configured with the first segment location data, initiates traffic signal preemption in response to a preemption request transmitted from within the first geographical area described by the first segment location data.

* * * * *

UNITED STATES PATENT AND TRADEMARK OFFICE

CERTIFICATE OF CORRECTION

PATENT NO. : 8,487,780 B2
APPLICATION NO. : 12/731780
DATED : July 16, 2013
INVENTOR(S) : Edwardson It is certified that error appears in the above-identified patent and that said Letters Patent is hereby corrected as shown below:

On the Title Page

Assignee: “Global Traffic Technologies, Inc.” should read --Global Traffic Technologies, LLC--.

Signed and Sealed this
Seventh Day of January, 2014

Margaret A. Focarino
*Commissioner for Patents of the United States Patent and Trademark Office*